May 31, 1949.  A. C. RUGE  2,472,047
ELECTRICAL LOAD WEIGHING APPARATUS
Filed March 14, 1946  3 Sheets-Sheet 1

INVENTOR
ARTHUR C. RUGE
BY
Edward T. Hathaway
ATTORNEY

May 31, 1949. A. C. RUGE 2,472,047
ELECTRICAL LOAD WEIGHING APPARATUS
Filed March 14, 1946 3 Sheets-Sheet 2

INVENTOR
ARTHUR C. RUGE
BY
ATTORNEY

May 31, 1949.  A. C. RUGE  2,472,047
ELECTRICAL LOAD WEIGHING APPARATUS
Filed March 14, 1946  3 Sheets-Sheet 3

INVENTOR
ARTHUR C. RUGE
BY
ATTORNEY

Patented May 31, 1949

2,472,047

UNITED STATES PATENT OFFICE 2,472,047

ELECTRICAL LOAD WEIGHING APPARATUS

Arthur C. Ruge, Cambridge, Mass., assignor to The Baldwin Locomotive Works, a corporation of Pennsylvania Application March 14, 1946, Serial No. 654,246

10 Claims. (Cl. 201—63)

This invention relates to dynamometers and more particularly to load weighing cells.

Load weighing cells find applications in many different fields where load forces are to be measured or masses are to be weighed, although one special field of application is where the cells remain permanently located in apparatus, such for example as storage tanks, bins, scales and other devices. In connection with tanks, bins, or other storage containers, they preferably rest on top of the load cells, or are otherwise supported so that the weight of the container contents may be determined at any time. The cells disclosed herein are of the type employing preferably electrical impedance strain responsive means which may be of various types, one form of which is the bonded wire type strain gage disclosed in Patent No. 2,292,549, although as also illustrated herein non-electrical responsive means may be employed in a novel arrangement.

It is an object of my invention to provide an improved load weighing cell that is capable of having a high degree of accuracy and sensitivity in a structure which is adapted to substantially eliminate the effects of angularity of load, eccentricity, and torsion, and to do so in a relatively simple and economical manner combined with compactness, ruggedness and durability.

A further object is to provide improved means for determining, whenever desired and with ease and dispatch, the zero load reading of the strain measuring means or to determine the consistency of measurement of the cell. This question is of particular importance where it is not desirable or feasible to remove the cells for checking, as is especially true in case a very large number of cells form a normal permanent part of extensive installations, such as vats, bins and tanks which are used in commercial production and distribution plants of chemical and petroleum products among many others.

Other objects and advantages will be more apparent to those skilled in the art from the following description of the accompanying drawings in which.

Figure 1:
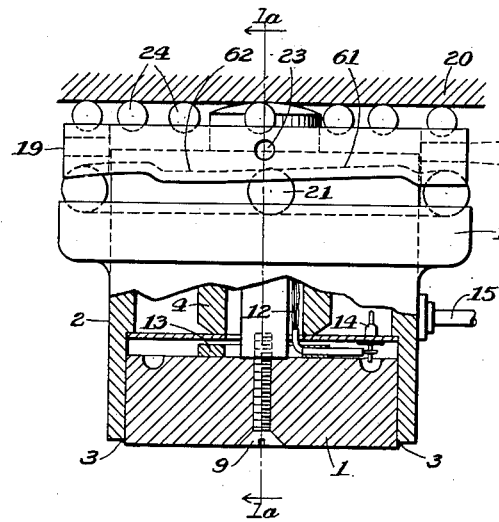
Fig. 1 is a partial sectional view of one form of my improved compression cell together with means for determining zero stability and consistency of measurement.
Figure 1A:
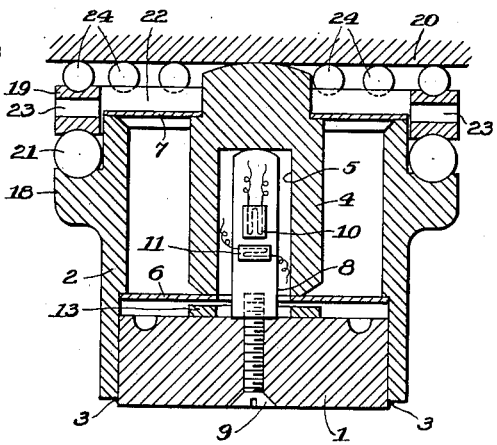
Fig. 1a is taken along line 1a—1a of Fig. 1.

In the particular embodiment shown in Figs. 1 and 1a, a supporting structure or casing consists of a relatively heavy base 1 and a rigid, preferably cylindrical, shell 2 which may be welded at 3 to base 1 or otherwise suitably secured thereto. Disposed within the shell is a floating type load transmitting piston 4 having a bore 5. The upper and lower ends of this piston are centered and guided for small axial movement by preferably annular diaphragms 6 and 7 suitably secured to the piston and to heavy shell 2 preferably by welding or brazing at the points of juncture between these elements. The lower diaphragm 6 has an opening corresponding to bore 5 to permit a load sensitive element 8 to extend into the bore thereby to obtain maximum axial compactness. The lower end of element 8 is seated upon base 1 and is preferably rigidly secured to it as by a screw 9 while the upper end of the element is preferably semi-spherical and has abutting engagement with the piston at the end wall of bore 5. Suitable electrical strain responsive impedance means preferably of the bonded wire type gage are diagrammatically indicated at 10. There are bonded to the surface of element 8 at any desired number of points around its circumference in order to eliminate bending effects or any other undesired conditions. Temperature compensating gages 11 of the same type may be transversely mounted on the surface of the load sensitive element 8. The leads to these gages may be carried down through suitable electrical conductors 12 and thence laterally through a hole in an overload safety ring 12 which is slightly spaced beneath the piston and upwardly through the lower diaphragm as at 14 for connection to an external cable 15. The safety ring or stop 13 can be set for a clearance such that, upon reaching a safe load beyond the working range, any further load is transferred from piston 4 direct through 13 to base 1, thus allowing the unit to carry many times the normal full load and still function perfectly within its operating range. The gages may be arranged if desired to form a well-known Wheatstone bridge in conjunction with any suitable instrument for measuring or utilizing for control purposes change of resistance of the gages in response to change of strain in the load element 8 as load is applied thereto.

It is thus seen that the load cell of Figs. 1 and 1a is extremely compact in that the floating piston, sensitive element and casing are arranged concentrically. In this manner only a single load sensitive element such as 8 is employed but this is combined, however, with the floating piston which has not only maximum freedom of axial movement but such movement is maintained in a true axial direction under all conditions by reason of the widely axially spaced upper and lower diaphragms. This arrangement of widely spaced diaphragms provides a large moment arm for resisting eccentric loads acting downwardly on the upper end of piston 4 which, if desired, can also have a semi-spherical load receiving surface. In the same manner lateral loads are effectively resisted by the diaphragms so that element 8 responds substantially to an axial component of load. The arrangement also permits the load sensitive element 8 to be totally enclosed and, if desired, to be hermetically sealed if the attaching connections, such as brazing, extend around the entire periphery of the various component parts. It is well adapted for potting for sealing purposes. The cell as described lends itself to standardization for many different load capacities in that it is only necessary to change the capacity of the load sensitive element 8 as by making it larger or smaller in cross-sectional area or of different elastic modulus as the capacity may require, it being understood that this element may be of cylindrical cross-section but is preferably square, solid or hollow, to facilitate application of the gages. The structure is also ideally suited to prevent errors due to torsion as in loads applied by a screw.

To determine zero stability and also consistency of measurement of the cell, I have provided a relatively simple and compact means, as a self-contained cooperative part of the cell, for relieving the load on the load sensitive element 8 without requiring the cell to be removed from its permanent location. It will be understood that it may be frequently desirable in particular applications to test a cell regardless of how long it may have been in service without recourse to employing unwieldy equipment for jacking or lifting up a tank or other load which normally rests upon the load cell. For instance, in connection with tanks containing liquids, solids, or other material which may be added to or removed from a tank during the course of its use, such tanks or containers are rarely, if ever, completely emptied. However, by my improved arrangement, the load may be removed from the load sensitive element 8 to determine the zero reading of the device as well as to easily relieve and reapply the load as many times as desired to determine whether the cell consistently and faithfully reproduces the same result for a given load which is present at the moment in the container.

To this end, I have provided, as shown in Figs. 1 and 1a, one particular form of lifting means consisting of a lower annular ball race 18 seated upon the upper end of the heavy cylindrical shell 2 while a rotatable ball race 19 is interposed between the lower race and a suitable load surface 20 of the object to be weighed. The rotatable race 19 is very slightly inclined to provide a cam surface for balls 21. All of the races are preferably grooves so that the lower set of ball bearings 21 will suitably center the rotatable race 19 at all times, although if desired the rotatable ball race may be guided by the cell periphery. The race 19 has an opening 22 of larger diameter than the upper end of piston 4 and hence cannot transmit any lateral or frictional forces to the piston. A simple race is shown to guide balls 24 which act against load surface 20. As many cam race surfaces may be used as desired, preferably not less than three. In operation, it is only necessary to insert a bar type of handle 22' or spanner wrench of any suitable length into any one of a series of peripheral recesses 23 in race 19 whereby upon rotation of the race the ball bearings 21 will ride up on the cam races to cause the upper set of ball bearings 24 to lift load surface 20. The extent of lifting movement need only be a matter of a few thousandths of an inch sufficient to lift the piston 4 from contact with strain sensitive element. For convenience, a section 61 of the lower race of 19 is made inclined, terminating in a section 62 which is not inclined, so that the load will remain lifted without holding handle 22. With load thus removed from sensitive element 8, a measuring instrument or Wheatstone bridge may then be read to determine the true zero load reading. If any variation of serious amount has occurred, the cell can then be removed for replacement. While this would occur only rarely at best, yet it is desirable to be able to make such a test and to this end my invention provides an extremely simple, convenient and effective means. Another reason for determining true zero is that the empty tank or container weight may have been changed due to repairs or alterations and the user will wish to be sure he is not confusing these changes with changes in zero stability of the cells. In addition, my improved lifting device allows a load to be repeatedly lifted and re-applied as many times as is necessary. In this way it is possible to determine whether the cell is functioning so as to consistently weigh a given load, it being understood of course that the test load is whatever load presently exists in the container during such testing operation. In some cases, the responsive instrumentation used with the cell may be in question.

Figure 2:
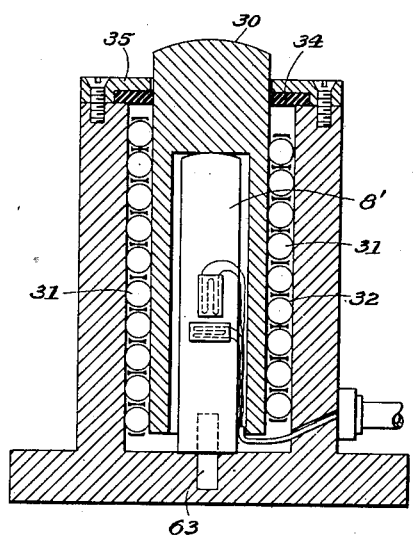
Fig. 2 is a modifications of Fig. 1 in which antifriction means such as ball bearings are employed in place of diaphragms for guiding a load transmitting piston.

In the other modifications, such as shown in Fig. 2, a piston 30 is guided by a series of ball bearings 31 preferably spirally arranged between the piston and a ball race 32 which, as shown, may constitute the inner cylindrical surface of the shell bore. Such a spirally arranged ball bearing per se or other suitable type anti-friction bearing is well-known and hence further detailed description thereof is not deemed necessary except to point out that the amount of axial movement of piston 30 is so small that the ball race 32 may, if desired, be of substantially the same length as the guiding portion of piston 30. A load sensitive element 8' with gages thereon similar to those of Fig. 1 are located within a bore of piston 30 in the same manner as shown in Fig. 1 and hence further description is not needed. As a variation, member 8 is located by a pin 63.

The axial length of the bearing in Fig. 2 is such that it laterally guides the piston 30 at widely spaced axial points thereby providing a large moment arm for resisting any tilting of the piston due to eccentric or lateral loading, this being broadly the same in principle to the use of the two diaphragms 6 and 7 of Fig. 1 which laterally support piston 4 at widely axial points thereof. Thus the possibility of transmitting eccentric or lateral loads from the piston to the load sensitive element 8 or 8' is completely eliminated or reduced to a negligible amount. If desired, an annular seal 34 of rubber or other flexible material may closely surround piston 30 and be held in place by an annular keeper plate 35. Torsional forces can be resisted by keying 30 against rotation or by using other well-known restraints which do not interfere with the slight vertical motion. Another way to resist torsional forces is to have the balls in vertically grooved race ways so as to resist rotation of the piston. A still different way is to combine a single diaphragm with the balls of Fig. 2, etc., the diaphragm resisting torsional forces as is the case with the diaphragms of Fig. 1.

Figure 3:
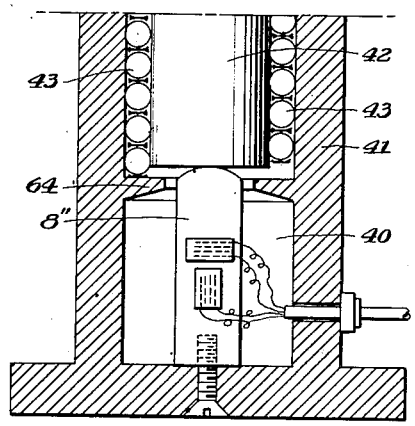
Fig. 3 is a further modification of Fig. 2 in which the parts are axially spaced apart rather than telescoped as in Figs. 1 and 2.

In the modification shown in Fig. 3 a load sensitive element 8'' is located in a lower chamber 40 of the casing shell 41 while a load piston 42 corresponding to piston 30 is supported in the upper end of the casing and is guided by ball bearings 43 similar to 31. The same gage arrangement is employed on the element 8'' as in the other forms and the many advantages of the other forms are present in Fig. 3. A safety shelf 64 serves as overload protection in case 8'' fails or to allow high overload without damage to the sensitive element. This shelf can be applied to Figs. 3, 4, 5, 6, etc.

Figure 4:
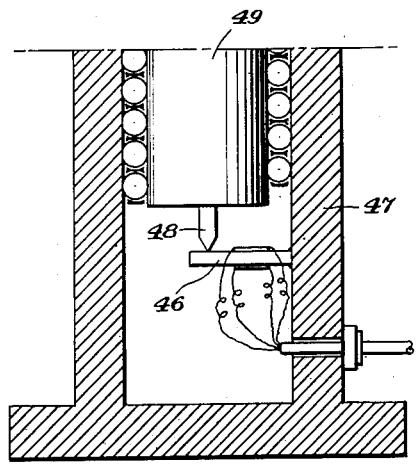
Fig. 4 is a further modification in which a bending beam, with strain gages thereon, is employed.

In Fig. 4 a bending beam load sensitive element 46 is provided in place of the element 8'' of Fig. 3. This beam is suitably secured to one side of the casing 47 and is loaded by a preferably pointed member 48 with a pointed end which is attached to piston 49. Many other detailed contractions are obviously possible here.

Figure 5:
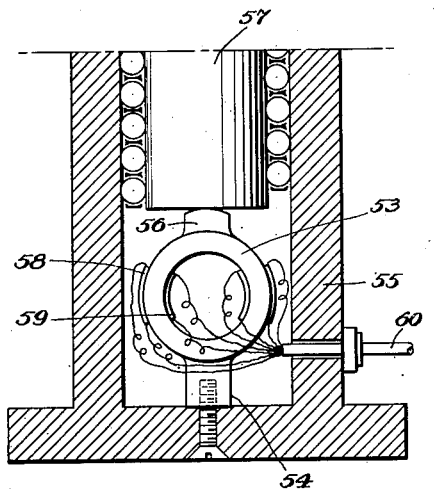
Fig. 5 is a further modification employing a ring type load responsive element.

In Fig. 5 an annular load sensitive ring 53 is provided with a lug 54 secured in the base of the casing 55 while an upper projection 56 on the ring engages the lower end of a piston 57 which is guided by roller bearings in the manner described for the other modifications. The ring 53 is provided with strain gages, preferably of the bonded wire type located preferably on the inner and outer peripheries as indicated at 58 and 59 at diametrically opposite sides of the ring. Suitable leads connect these gages with an external connection 60 in the same manner as for Fig. 1. The upper portions of the modifications shown in Figs. 3 to 5 are not shown inasmuch as they are identical to Fig. 2 or to Fig. 1 in case lifting means are desired to be used.

Figure 7:
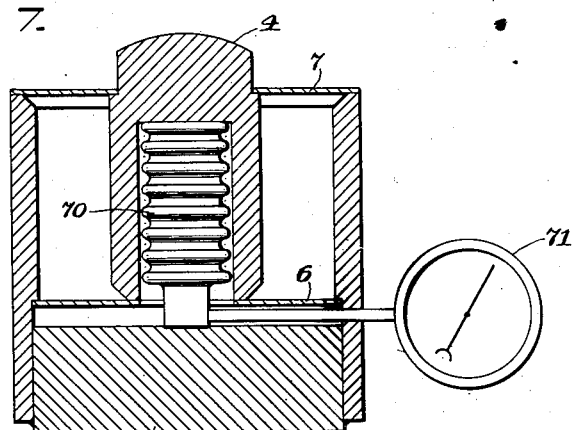
Fig. 7 shows a hydraulic responsive means employing a bellows connected to a fluid pressure gage.
Figure 6:
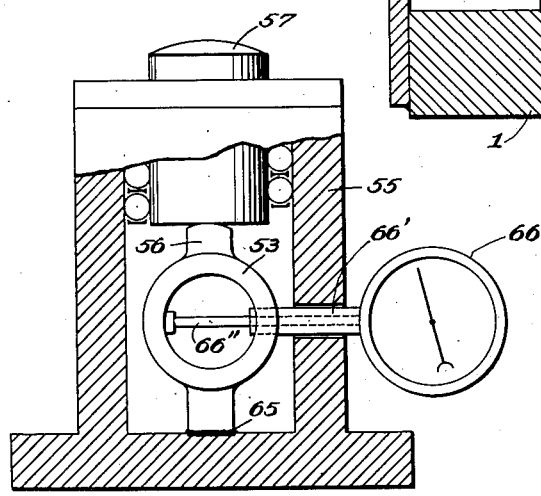
Fig. 6 is similar to Fig. 5 in which mechanical means is employed for measuring the deflection of the load sensitive member.

Figs. 6 and 7 illustrate the broad usefulness of my invention as it relates to non-electrical responsive means. In Fig. 6 a dial indicator 66 of any suitable form such as an "Ames" dial gage is used in an elastic ring arrangement similar to Fig. 5. Similar parts are, therefore, given identical reference numbers. The dial gage has an extended fixed post 66' passing freely through an opening in the shell 55 and supported on one side of the ring 53. An axially movable gage operating pin 66'' continues through such side of the ring and diametrically across for abutting engagement with the opposite side. In operation, the ring diameter expands and contracts with load, thereby causing relative movement between the stem and pin to operate the dial pointer. A well-known screw type micrometer can be employed in place of the dial, such a micrometer having its usual frame and pin corresponding to stem 66' and pin 66''. It will be clear of course that the load sensitive element 53 is broadly any device which deflects in response to load and the load measuring or indicating element can have a wide variety of forms without violating the spirit of the invention. The load sensitive element is indicated as brazed or welded to the base at 65 instead of being held by a pin such as 63, Fig. 2.

In Fig. 7, a hydraulic system weighs the load in terms of pressure set up in a bellows 70 which is used in place of element 8 in Fig. 2. Otherwise, the two arrangements are identical so that similar parts are given the same numbers. A fluid pressure gage 71 is connected to the bellows for indicating the load. It is clear that in the bellows device the diaphragms 6 and 7 can, if desired, carry only a relatively small fraction of the load. Or, diaphragms 6 and 7, supplemented by springs, if necessary, could be the load sensitive means while the hydraulic system is used merely to indicate the amount of motion of the piston 4. Such spring can be of a coil type located beneath the lower end of piston 4 or arranged concentrically of the bellows and engaging base 1 and the bottom of the piston bore. The fact that the diaphragms themselves can be the load sensitive means or a substantial part thereof is particularly useful in the case of a very low capacity unit employing magnetic or capacity pickups as means for measuring the deflection of the load sensitive means. In fact, the diaphragms in this case should constitute the entire spring stiffness of the unit.

It is, of course, clear that any of the load or deflection sensitive devices shown or mentioned can be combined with any of the guided piston structures. Further, that the diaphragm construction may be combined with the ball bearing construction, if desired. This latter combination may be useful for example in providing torsional resistance to the structure of Fig. 2 by adding one or more flexible diaphragms connecting the piston and the outer case. In such a structure the diaphragms could be exceedingly flexible in an axial direction (even corrugated) and still be able to withstand a very considerable torsional force to prevent rotation of the piston relative to the outer shell.

Although I have shown annular diaphragms for purposes of illustration, it will be clear that flexure plates can be used as well, in which case there would preferably be two or more flexure plates at each diaphragm level, although even one flexure plate at each level would suffice in some instances.

Figure 8:
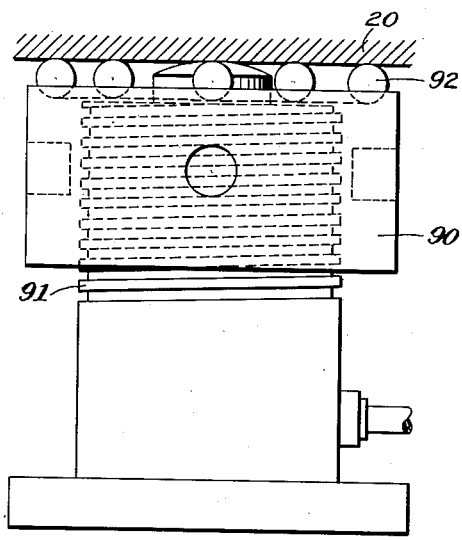
Fig. 8 is a modified lifting means in the form of a threaded nut arranged in relatively simple and effective cooperation with the cell.

Instead of the ball and cam race lifting means shown in Figs. 1 and 1a, I may employ, as shown in Fig. 8, a nut 90 and screw threads 91 formed on the outer surface of the upper portion of the shell 2. The upper end of the nut may be provided with a ball race containing a ball bearing 92 engageable with the loading surface 20. In operation, the nut is rotated by use of any suitable handle inserted in the recesses of the nut which is rotated in one direction to remove the load from the load sensitive element and rotated in the opposite direction to re-apply the load. Details of construction of the cell are otherwise shown in any of the various modifications. The threads can be of the well-known ball bearing thread construction if it is desired to reduce turning friction to a minimum.

Figure 9:
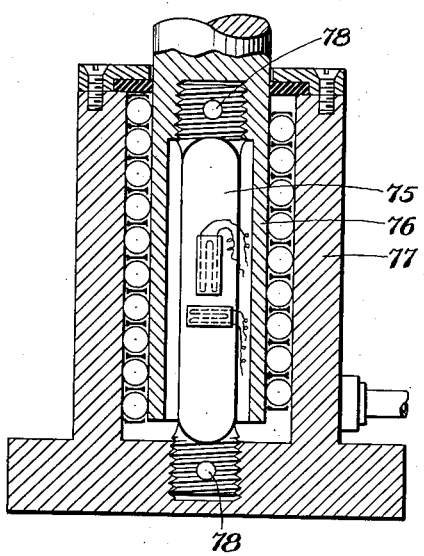
Fig. 9 is a modification in which the invention is applied to tension weighing devices.
Figure 10:
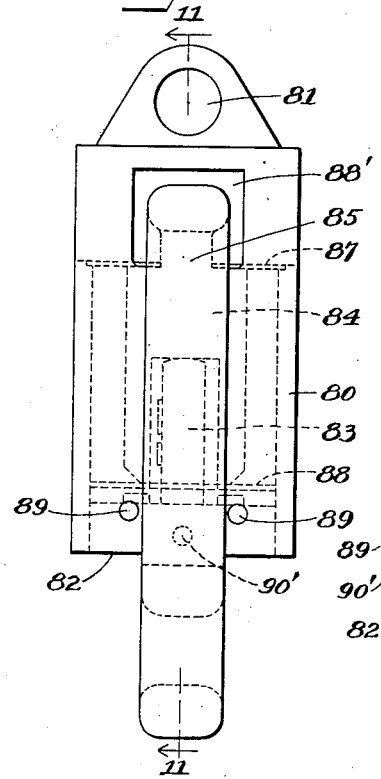
Fig. 10 is a side elevation of another modification showing a tension device.
Figure 11:
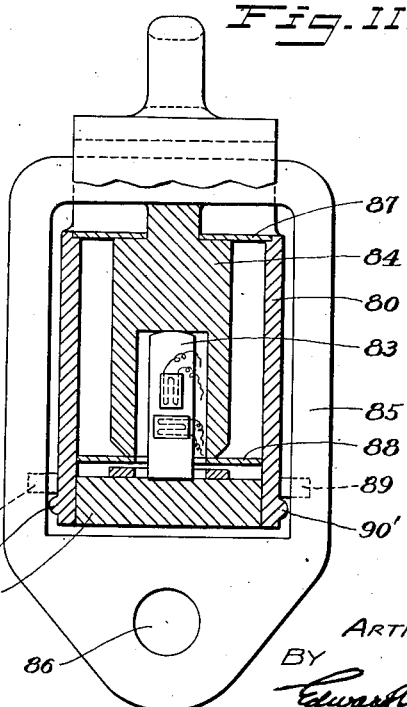
Fig. 11 is a vertical section taken on line 11—11 of Fig. 10.

Fig. 9 shows a load sensitive element 75 threaded at its ends into the pistons 76 and 77, and for purposes of illustration the anti-friction bearing is used to guide the piston. It is seen that this is a very simple device to assemble and that it will work equally well in tension and compression. Some simple means, such as the vertical keyway previously described, may be used to lock the piston against rotation or pins 78 may prevent the threaded ends from becoming unscrewed. Fig. 10 shows an arrangement in which the load sensitive element acts entirely in compression while tensile forces are applied to the unit, the basic principle of this load reversing construction being very old and well-known. The unique feature in my construction resides in the fact that the outer shell 80 itself is used to transmit a tensile force from an eye 81, or hook if desired, to the base 82 and thence to the lower end of the load sensitive element 83. A piston 84 has its upper end secured to an encircling link 85 whose lower end is also provided with a hook or eye 86. Diaphragms 87 and 88 are employed, these and parts 82, 83 and 84 being identical to similar parts in Figs. 1 and 1a. Also, shell 80 is similar to shell 2 except that in Fig. 10, the upper end of the shell is extended for attachment to eye 81 and is provided with a recess 88' through which link 85 extends. Lateral safety stops 89 and 90' are disposed between the links and shell for purposes of illustration.

Of course, it will be evident that any of the structures illustrated in Figs. 1 to 7 inclusive can function equally well as tension devices by merely attaching the load sensitive element on the piston are transmitted to it. Also, as seen in the various modifications, the so-called "pistons" can be of various axial depths and they can be free of any sliding contact guidance with the cell casing, the term simply defining a member which receives the load and transmits it to the load-responsive element and which is restrained so as to have only axial motion through the action of lateral guiding means. The so-called "piston" thus constitutes a laterally-guided load-transmitting means.

It will be obvious to those skilled in the measurement art that many other measuring or responsive means can be applied within the spirit of my invention. Thus, well-known capacity and inductance or reluctance gaging methods can be used equally well to measure the motion of the piston relative to the supporting structure. In such cases, the elastic stiffness is provided by any suitable elastic member such as I have shown in my illustrations, or by a simple spring, if desired, or the diaphragms of Fig. 1 may themselves serve as the spring. Any device responsive to force or deflection is, therefore, seen to be applicable. As a further example I might cite the well-known pneumatic gaging methods as responsive means in my invention. Electrical contact devices may be used to indicate predetermined movements as is well known in the art. Simple slide wire means are also well-known for measuring motion.

From the foregoing disclosure of the several modifications, it is seen that I have provided an extremely simple, rugged and compact weighing cell that is adapted to have a high degree of sensitivity, accuracy and durability with freedom from adverse effects of eccentric lateral and torsional loads and which permits a standardized cell to be easily adapted for different capacities.

It will of course be understood that various changes in details of construction and arrangement of parts may be made by those skilled in the art without departing from the spirit of the invention as set forth in the appended claims.

I claim:

1. A load weighing device comprising, in combination, a base and an axially extending supporting structure, a load transmitting piston having an axially extending bore, one end of which terminates at a closed end of the piston and the other end of which is open, a load sensitive element supported at one end on said base and its other end extending through said open end into said bore for load transmitting contact with said closed end of the piston whereby the sensitive element is operated in accordance with load acting on said piston, a plurality of means spaced axially of said piston and operatively connected to said supporting structure for laterally supporting and guiding the piston so that an axial component of load is transmitted to said load sensitive element substantially independent of lateral and eccentric load effects on the piston, and means responsive to the load acting on said sensitive element.

2. The combination set forth in claim 1 further characterized in that the axially spaced means for laterally supporting and guiding the load transmitting piston includes spaced flexure members extending laterally between the supporting structure and the piston and lying in planes substantially at right angles to the axis of the piston.

3. The combination set forth in claim 1 further characterized in that the axially spaced means for laterally supporting and guiding the load transmitting piston includes spaced annular flexure members extending laterally between the supporting structure and the piston and lying in planes substantially at right angles to the axis of the piston.

4. The combination set forth in claim 1 further characterized in that the axially spaced means for laterally supporting and guiding the load transmitting piston includes spaced flexure members extending laterally between the supporting structure and the piston and lying in planes substantially at right angles to the axis of the piston, and the means responsive to the operation of the sensitive element includes an electrical impedance strain gage mounted on said sensitive element at a location within said bore and between two planes, normal to the piston axis, each of which planes contains at least one of said flexure members.

5. The combination set forth in claim 1 further characterized by the provision of means formed as a self-contained part of the load weighing device to remove load at will from the load sensitive element.

6. The combination set forth in claim 1 further characterized by the provision of relatively rotatable members having relatively inclined surfaces arranged coaxially of the piston and adapted upon said relative rotation to remove load from the sensitive element.

7. A load weighing device comprising, in combination, a supporting structure, a load sensitive element supported by said structure, a load transmitting piston for operating said sensitive element in accordance with load acting on said piston, means operatively connected to said supporting structure for laterally guiding said piston, means responsive to the actuation of said sensitive element, and means formed as a self-contained part of said supporting structure to remove at will load from the load sensitive element.

8. The combination set forth in claim 7 further characterized in that the load removal means includes opposed annular race ways one of which is mounted on and encircles the supporting structure and the other of which is rotatable, one of said race ways having inclined cam surfaces and anti-friction means interposed between said race ways so as to lift the rotatable race way during rotation thereof and thereby remove load from the sensitive element.

9. The combination set forth in claim 7 further characterized in that the load removal means includes relative rotatable elements certain of which are formed on said supporting structure, and relatively inclined cam surfaces between said elements whereby upon relative rotation the load may be removed from the sensitive element.

10. A load weighing device comprising, in combination, a base, a supporting structure extending axially therefrom, an axially extending load transmitting piston spaced from said base, a load sensitive element having one end supported on said base and its other end in load transmitting contact with said piston whereby the sensitive element is operated in accordance with load acting on said piston, a plurality of axially spaced flexure members operatively connected to said supporting structure and to said piston for laterally supporting and guiding the piston so that an axial component of load is transmitted to said load sensitive element substantially independent of lateral and eccentric load effects on the piston, and means responsive to the load acting on said sensitive element.

ARTHUR C. RUGE.

REFERENCES CITED

The following references are of record in the file of this patent:

UNITED STATES PATENTS

| Number | Name | Date |
|---|---|---|
| 1,953,819 | Payne | Apr. 3, 1934 |
| 2,248,047 | Addy et al. | July 8, 1941 |
| 2,327,935 | Simmons | Aug. 24, 1943 |
| 2,392,702 | Saunders | Jan. 8, 1946 |